United States Patent
MacDonald Boyce et al.

(10) Patent No.: US 8,514,887 B2
(45) Date of Patent: Aug. 20, 2013

(54) METHOD AND APPARATUS FOR REPAIRING SAMPLES INCLUDED IN CONTAINER FILES HAVING LOST PACKETS

(75) Inventors: Jill MacDonald Boyce, Manalapan, NJ (US); Brian David Anderson, Florence, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 12/310,089

(22) PCT Filed: Aug. 21, 2007

(86) PCT No.: PCT/US2007/018497
§ 371 (c)(1),
(2), (4) Date: Feb. 10, 2009

(87) PCT Pub. No.: WO2008/027253
PCT Pub. Date: Mar. 6, 2008

(65) Prior Publication Data
US 2009/0245283 A1    Oct. 1, 2009

Related U.S. Application Data

(60) Provisional application No. 60/823,880, filed on Aug. 29, 2006.

(51) Int. Cl.
*H04J 3/24* (2006.01)

(52) U.S. Cl.
USPC .......................................................... 370/474

(58) Field of Classification Search
USPC .................. 370/252, 253, 254, 474
See application file for complete search history.

(56) References Cited

U.S. PATENT DOCUMENTS

| | | | | |
|---|---|---|---|---|
| 5,537,416 A | * | 7/1996 | MacDonald et al. | 714/748 |
| 6,357,028 B1 | * | 3/2002 | Zhu | 714/751 |

(Continued)

FOREIGN PATENT DOCUMENTS

| | | |
|---|---|---|
| EP | 1589770 | 10/2005 |
| JP | 2002290742 | 4/2002 |
| JP | 2004537911 | 12/2004 |

OTHER PUBLICATIONS

Wenger M. M. Hannuksela T Stockhammer M. Westerlund D. Singer S. "RTP payload Format for H.264 Video: draft-ietf-avt-rtp-h264-11. txt;" IETF Standard-Working-Draft, Internet Engineering Task Force, IETF, CH, vol. avt, No. 11, Aug. 2004 XP015015808 ISSN: 0000-0004 p. 3, paragraph 1.1, p. 6, paragraph 2, p. 11, paragraph 5.2, p. 29, paragraph 6.

(Continued)

*Primary Examiner* — Mark Rinehart
*Assistant Examiner* — Mohammad Anwar
(74) *Attorney, Agent, or Firm* — Robert D. Shedd; Paul P. Kiel; Xiaoan Lu (57) ABSTRACT

There are provided a method and apparatus for repairing samples included in container files having lost packets. The apparatus includes a receiver and a file patcher. The receiver is for receiving packets including container files therein, identifying any of the packets for which a packet loss has occurred, and identifying at least one sample having data included in the identified packets that is affected by the packet loss. The at least one sample respectively corresponds to a particular container file. The file patcher is for repairing the particular container file with respect to the at least one sample.

12 Claims, 4 Drawing Sheets

(56) References Cited

U.S. PATENT DOCUMENTS

| | | | |
|---|---|---|---|
| 6,643,298 B1 * | 11/2003 | Brunheroto et al. | 370/537 |
| 6,977,948 B1 * | 12/2005 | Chennubhotla et al. | 370/516 |
| 7,609,645 B2 * | 10/2009 | Miyaji et al. | 370/252 |
| 7,657,938 B2 * | 2/2010 | Palmer, Jr. et al. | 726/23 |
| 2002/0152440 A1 | 10/2002 | Yona et al. | |
| 2003/0034911 A1 | 2/2003 | Martini et al. | |
| 2005/0280720 A1 * | 12/2005 | Kwon et al. | 348/231.3 |
| 2006/0062312 A1 | 3/2006 | Lee et al. | |
| 2006/0120687 A1 * | 6/2006 | Kida et al. | 386/46 |
| 2006/0212908 A1 * | 9/2006 | Hunter et al. | 725/70 |
| 2007/0033494 A1 * | 2/2007 | Wenger et al. | 714/776 |
| 2007/0076680 A1 * | 4/2007 | Amram et al. | 370/349 |

OTHER PUBLICATIONS

David Singer et al.: International Organisation for Standardisation ISO/IEC JTC1/SC29/WG11 Coding of Moving Pictures and Audio. Text of ISO/IEC FDIS 14496-14 MPEG-4 Systems.

David Singer et al.: International Organisation for Standarisation Coding of Audio, Picture, Multimedia, and Hypermedia Information, Proposed Revised Common Text Multimedia File Format Specification, MP4 and MJ2 Project Edisotr, Projects: 14496-12: ISO Base Media File Format.

David Singer et al.: International Organization for Standardization, Coding of Moving Pictures and Audio, ISO/IEC 14496-15/fdis, MPEG-4 ISO/IEC JTC1/SC29/WG11.

T. Paila et al. Oct. 2004, "Network Working Group" FLUTE—File Delivery over Unidirectional Transport.

S. Wenger et al. Feb. 2005, Network Working Group RTP Payload Format for H.264 Video.

H. Schulzrinne et al.Jul. 2003, Network Working Group: RTP: A Transport Protocol for Real-Time Applications.

Thomas Wiegand et al.: "Joint Video Team (JVT) of ISO/IEC MPEG & ITU-T VCEG (ISO/IEC JTC1/SC29/WG11 and ITU-T SG16 Q.6) 8*th* Meeting : Geneva, Switzerland, May 23-27, 2003. "Draft ITU-T Recommendation and Finald Draft International Standard of Joint Video Specification (ITU-T Rec. H.264 ISO/IEC 14496-10 AVC).

Copy of International Search Report dated Feb. 29, 2008.

* cited by examiner

METHOD AND APPARATUS FOR REPAIRING SAMPLES INCLUDED IN CONTAINER FILES HAVING LOST PACKETS

CROSS-REFERENCE TO RELATED APPLICATIONS

This application is a National Stage Application and claims the benefit, under 35 U.S.C. §365 of International Application PCT/US2007/018497 filed Aug. 21, 2007, which was published in accordance with PCT Article 21(2) on Mar. 6, 2008 in English, and which claims the benefit of U.S. Provisional Patent Application No. 60/823,880 filed on Aug. 29, 2006.

TECHNICAL FIELD

The present principles relate generally to video encoding and, more particularly, to a method and apparatus for repairing samples included in container files having lost packets.

BACKGROUND

A container format is a computer file format that can include various types of data, compressed by means of standardized encoders and codecs. The container file is used to identify and interleave the different data types. Simpler container formats can include different types of audio codecs, while more advanced container formats can support audio, video, subtitles, chapters, and meta-data (tags), along with the synchronization information needed to play back the various streams together.

When container files are broadcast or multicast over lossy networks, packet errors may occur upon the file reception. Some video decoders are not robust with respect to channel errors. It is often easier for a video decoder or player to be able to process compressed video files with entirely missing slices or pictures than to be able to process compressed video files with partially missing slices or pictures. Due to variable length coding, it is difficult for a video decoder to detect missing or corrupt data, because every bit can be interpreted as an allowable, but incorrect, symbol. Additionally, some container file formats, such as the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard"), rely on a table of offsets in order to identify the location of whole slices or pictures in a file. When data is missing, these offsets will be incorrect, preventing proper video decoder operation.

When video is streamed over packet networks, the Real-time Transport Protocol (RTP) is typically used. Real-time Transport Protocol packet headers include sequence numbers which can be used to identify missing packets. Real-time Transport Protocol data packets may be of variable lengths. It is generally recommended that compressed video slices be aligned with packets. If a packet includes one or more complete slices and the packet is lost, the decoder will not have the ability to process fractional slices.

The MPEG-4 AVC standard specifies Network Abstraction Layer (NAL) units, in which coded slices must be included. Macroblocks in a coded picture are placed into one or more slices. Network Abstraction Layer units may also include other types of data, such as sequence or picture parameter sets, Supplemental Enhancement-information (SEI) messages, and so forth. When a MPEG-4 AVC Standard compliant bitstream is streamed over Internet Protocol (IP) networks, it is typical to use a scheme which specifies a syntax for sending a MPEG-4 AVC Standard compliant bitstream using Real-time Transport Protocol. In one prior art approach, if neither fragmentation nor aggregation units are used, a single entire Network Abstraction Layer unit is placed in an Internet Protocol packet for transmission. If that packet is lost due to transmission errors, a single entire Network Abstraction Layer unit is lost. If aggregation units are used, several entire Network Abstraction Layer units are placed in a single packet. If that packet is lost due to transmission errors, the several entire Network Abstraction Layer units are lost. In these cases, the partial Network Abstraction Layer units will not arrive at a corresponding receiver. If fragmentation units are used, a single large Network Abstraction Layer unit is split across multiple packets. A receiver can detect if one or more of these packets are lost due to transmission errors by using sequence numbers included in the Real-time Transport Protocol packets.

If a fragmentation unit is lost, the receiver should discard all following fragmentation units in transmission order corresponding to the same fragmented Network Abstraction Layer unit. A receiver in an endpoint or in a Media Aware Network Element (MANE) may aggregate the first n-1 fragments of a Network Abstraction Layer unit to an (incomplete) Network Abstraction Layer unit, even if fragment n of that Network Abstraction Layer unit is not received. In this case, the forbidden_zero_bit of the Network Abstraction Layer unit is set to one to indicate a syntax violation. In accordance with the MPEG-4 AVC Standard, the Network Abstraction Layer unit header includes a one bit syntax field called the forbidden_zero_bit. In MPEG-4 AVC Standard compliant bitstreams, the forbidden_zero_bit is typically equal to 0. When an error in the bitstream syntax is detected, the decoder may consider the detected condition as an indication that byte alignment may have been lost and may discard all bitstream data until the detection of byte alignment at a later position in the bitstream.

The MPEG-4 AVC Standard defines a filler data Network Abstraction Layer unit type. A decoder is expected to ignore Network Abstraction Layer units including filler data.

File transfer over bi-directional networks frequently uses a reliable protocol such as, for example, Transmission Control Protocol (TCP). If a packet loss occurs, re-transmission is used to ultimately receive all of the data in a file. When files are transferred over unidirectional networks or bi-directional networks using unreliable protocols, re-transmission is not used.

Compressed video and audio can be stored together in multimedia container formats, in accordance with, for example, the MPEG-4 AVC Standard, an Audio Video Interleaved (AVI) format, the $3^{rd}$ Generation Partnership Project (3GPP), and the ISO/IEC MPEG-2 Standard. The MPEG-4 AVC Standard includes a container file format that may be used to store several different video (MPEG-2 video, MPEG-4 Part 2 video, or MPEG-4 AVC video) or audio (MPEG-2 Layer 3, Advanced Audio Coding (AAC)) formats. The MPEG-4 AVC Standard file format is based on the ISO media file format.

The basic unit in a MPEG-4 AVC file is a sample, which for video is typically an entire coded picture. In non-hint tracks, a sample is an individual frame of video, a time-contiguous series of video frames, or a time-contiguous compressed section of audio. In hint tracks, a sample defines the formation of one or more streaming packets. No two samples Within a track share the same time-stamp.

A MPEG-4 AVC file includes a sample table. The sample table provides information for each sample (typically a coded picture) that indicates the offset in the file, where the sample is located, and the sample size.

The sample table includes all the time and data indexing of the media samples in a track. Using the tables, it is possible to locate samples in time, determine their type (e.g., I-frame or other), and determine their size, container, and offset into that container.

If the track that the Sample Table Box is included in does reference data, then the following sub-boxes are may be required: Sample Description, Sample Size, Sample To Chunk, and Chunk Offset.

The MPEG-4 AVC file format has been extended to included MPEG-4 AVC video. When MPEG-4 AVC video is included in the MPEG-4 AVC file format, start codes are not included in the file.

A file delivery protocol referred to as File Delivery over Unidirectional Transport (FLUTE) is aimed at multicast delivery over uni-directional networks. File Delivery over Unidirectional Transport can be used to deliver MPEG-4 AVC files. All File Delivery over Unidirectional Transport transmitted packets in a particular File Delivery over Unidirectional Transport session will be of the same length and, hence, will not be aligned with the variable length coded slices or pictures in the MPEG-4 AVC file. If packet loss occurs during delivery of a MPEG-4 AVC file, then the received partial MPEG-4 AVC file is invalid. The offsets in the sample table will point to incorrect locations. Due to variable length coded pictures, in an invalid MPEG-4 AVC file, an offset in the MPEG-4 AVC sample table which should point to the start of a particular coded frame will instead point to an unknown location in the bitstream data, which would likely be in the middle of a coded frame. Each File Delivery over Unidirectional Transport packet contains a Source Block Number field which increments for each transmitted packet. The File Delivery over Unidirectional Transport protocol includes a File Description Table (FDT) which includes a field to indicate the size of the file to be delivered.

SUMMARY

These and other drawbacks and disadvantages of the prior art are addressed by the present principles, which are directed to a method and apparatus for repairing samples included in container files having lost packets.

According to an aspect of the present principles, there is provided an apparatus. The apparatus includes a receiver and a file patcher. The receiver is for receiving packets including container files therein, identifying any of the packets for which a packet loss has occurred, and identifying at least one sample having data included in the identified packets that is affected by the packet loss. The at least one sample respectively corresponds to a particular container file. The file patcher is for repairing the particular container file with respect to the at least one sample.

According to another aspect of the present principles, there is provided a method. The method includes receiving packets including container files therein; identifying any of the packets for which a packet loss has occurred; identifying at least one sample having data included in the identified packets that is affected by the packet loss, the at least one sample respectively corresponding to a particular container file; and repairing the particular container file with respect to the at least one sample.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to a method and apparatus for repairing samples included in container files having lost packets.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

Moreover, it is to be appreciated that while one or more embodiments of the present principles are described herein with respect to the MPEG-4 AVC standard and/or the Audio Video Interleaved (AVI) format, the present principles are not limited to solely this standard and/or format and, thus, may be utilized with respect to other video coding standards, recommendations, and extensions thereof, including extensions of the MPEG-4 AVC standard, and other joint video and audio formats, while maintaining the spirit of the present principles.

Also, it is to be appreciated that while one or more embodiments of the present principles are described herein with respect to File Delivery over Unidirectional Transport (FLUTE), the present principles are not limited to solely this protocol and, thus, may be utilized with respect to other file transfer protocols, while maintaining the spirit of the present principles.

Further, as used herein, the term "repair" refers to, and is synonymous with "patching". That is, affected samples (at least partially lost) due to a lost packet or packets are either removed from the container file (and the corresponding sample table is updated appropriately), or the affected samples (at least partially lost) are instead padded with filler bits. Filler bits are data that is intended for a decoder to discard and not to decode.

As noted above, the present principles are directed to a method and apparatus for repairing samples included in container files having lost packets.

In an embodiment, the present principles provide a method and apparatus for repairing a received container file with packet losses, so that it can be played by an audio/video decoder. The repair/patching process eliminates partially-received samples representing slices or pictures from the container file. This allows a decoder that is not robust with respect to corrupt slices or pictures to be able to process the file. The decoder may still perform error concealment to conceal the missing slices or pictures.

Figure 1:
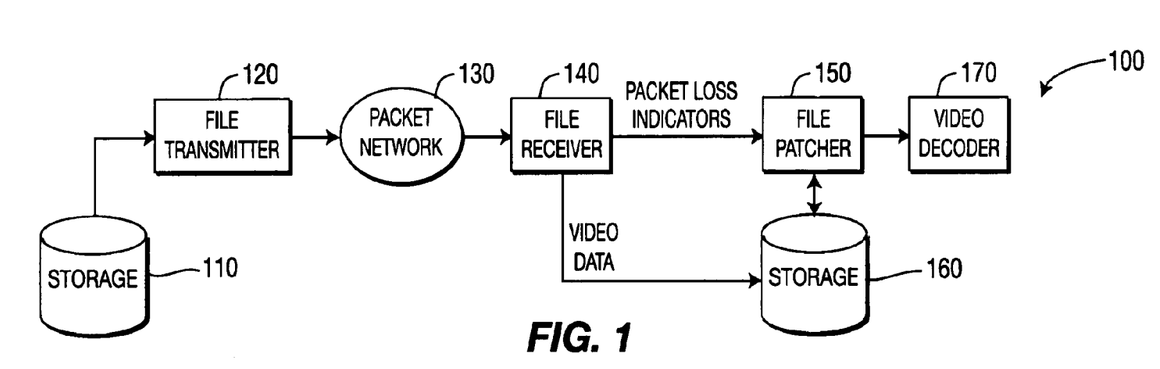
FIG. 1 is a block diagram for a unidirectional video file transfer system to which the present principles may be applied, in accordance with an embodiment of the present principles.

Turning to FIG. 1, a uni-directional video file transfer system is indicated generally by the reference numeral 100.

The system 100 includes a storage device 110 having an output connected in signal communication with an input of a file transmitter 120. An output of the file transmitter 120 is connected in signal communication with an input of a packet network 130. An output of the packet network 130 is connected in signal communication with an input of a file receiver 140. A first output of the file receiver 140 is connected in signal communication with an input of a file patcher 150. A second output of the file receiver 140 is connected in signal communication with an input of a storage device 160. A bi-directional input/output of the storage device 160 is connected in signal communication with a bi-directional input/output of the file patcher 150. An output of the file patcher 150 is connected in signal communication with an input of a video decoder 170.

Compressed video and optionally audio data are stored in a container file format, such as MPEG-4 or Audio Video Interleaved (AVI). The container file is transmitted over a network to a file receiver, where the file is stored locally. The file transfer protocol should be capable of indicating if any packet losses occurred. If File Delivery over Unidirectional Transport (FLUTE) is used as the file transfer protocol, then the file receiver can detect gaps in the received Source Block Number field. If the Source Block Number of a received packet is not one higher than the Source Block Number of the immediately previous received packet, then a packet loss can be detected. The file receiver 140 should indicate to the file patcher 150 the missing Source Block Numbers. A File Delivery over Unidirectional Transport file receiver can determine if transmission losses have occurred by comparing the received file size with the file size indicated in the File Description Table (FDT). If the received file size is not equal to the FDT file size, then it is known that transmission losses occurred, but does not determine which data was lost. If all data was received properly, it is not necessary to perform the file patching process.

Figure 2:
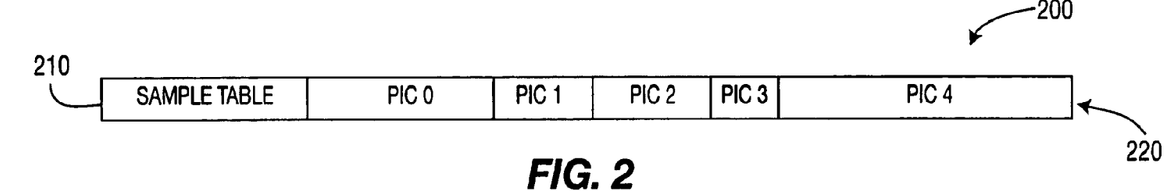
FIG. 2 is a diagram for an exemplary container file to which the present principles may be applied, in accordance with an embodiment of the present principles.

Turning to FIG. 2, an exemplary container file is indicated generally by the reference numeral 200. The container file 200 includes a sample table 210 and variable size coded pictures 220.

The sample table 210 includes information for each sample, such as, for example, the file offset and the size. Of course, the information is not limited to solely the preceding types of information and, thus, other types of information relating to samples may also be used, while maintaining the scope of the present principles. Table 1 shows exemplary content for a container file sample table, where each sample represents a coded picture.

TABLE 1

| pic num | offset | size |
| --- | --- | --- |
| 0 | 900 | 923 |
| 1 | 1823 | 415 |
| 2 | 2238 | 639 |
| 3 | 2877 | 312 |
| 4 | 3189 | 1527 |

Figure 3:
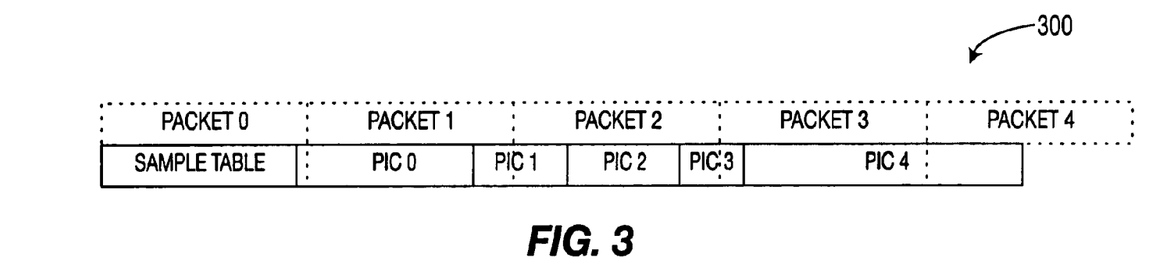
FIG. 3 is a diagram for an exemplary container file with transmit packetization to which the present principles may be applied, in accordance with an embodiment of the present principles.

Turning to FIG. 3, an exemplary container file with transmit packetization is indicated generally by the reference numeral 300. The container file 300 shows how the example container file is split into fixed size packets of length 1000 for transmission. In this example, packet 2 includes the end portion of picture 1, all of picture 2, and the starting portion of picture 3.

Figure 4:
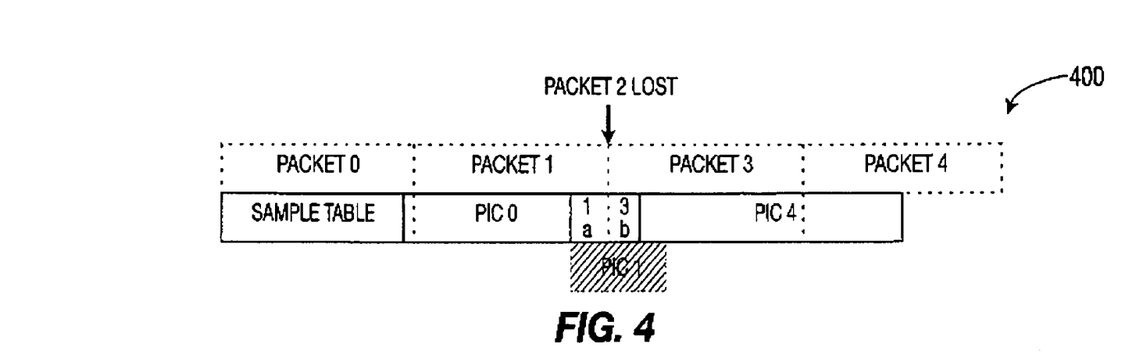
FIG. 4 is a diagram for an exemplary container file with transmit packetization and packet loss to which the present principles may be applied, in accordance with an embodiment of the present principles.

If packet 2 was lost during transmission, the data included in packet 2 would be lost. If a decoder attempted to decode the file without a file patching process being used, when trying to decode picture 1, it would operate on incorrect data. FIG. 4 illustrates this example.

Turning to FIG. 4 an exemplary container file with transmit packetization and packet loss is indicated generally by the reference numeral 400. When the decoder 170 attempted to access the expected 380 bytes of picture 1 indicated in the sample table, it would get the correct initial portion of picture 1, indicated in FIG. 4 as 1a, the final portion of picture 3 indicated as 3b, and a portion of picture 4. Due to variable length coding, the decoder would likely not be able to detect that it was processing invalid data, so would interpret the data incorrectly. This could cause very strange looking video, when for example a transform coefficient was interpreted to be a motion vector. Additionally, it would be possible for the decoder to crash because of attempting to access inappropriate memory locations.

Patching in accordance with one or more embodiment of the present principles solves this problem of sending a decoder invalid data. In an embodiment, a file patching process would be applied to the container file, during or after file reception, and before decoding. In the patching process, for each lost packet, a determination would be made of which samples are impacted by the lost packet because at least a portion of the sample is missing. Then the container file is updated for each of those impacted samples to eliminate corrupt samples. Some of the correctly received data is removed or replaced, in order to allow the decoder to guarantee that it will only receive valid coded pictures or slices.

In an embodiment, the process to determine which samples are impacted by a lost packet utilizes information from the file transfer protocol, e.g., File Delivery over Unidirectional Transport, including the packet length, pkt_length, and Source Block Numbers that were determined by the file receiver as corresponding to lost packets. The process also uses information from the container file format's sample table, including the sample offset (or chunk offset) and sample size. These parameters are used to determine any overlap between the bytes that were in the lost packets and the corresponding coded samples in the container file. For a particular sample, if any overlap exists between the sample and a lost packet, such that at least a portion of the sample is missing, the sample is marked as being impacted by the packet loss.

It is to be appreciated that the use of File Delivery over Unidirectional Transport to determine which samples are impacted by a lost packet is described herein for illustrative purposes and the present principles are limited to solely the use of File Delivery over Unidirectional Transport for such determination. That is, given the teachings of the present principles provided herein, one of ordinary skill in this and related arts will contemplate the use of File Delivery over Unidirectional Transport and other protocols and approaches to determine which samples are impacted by a lost packet, for use in performing a repair in accordance with the present principles, while maintaining the spirit of the present principles.

Figure 7:
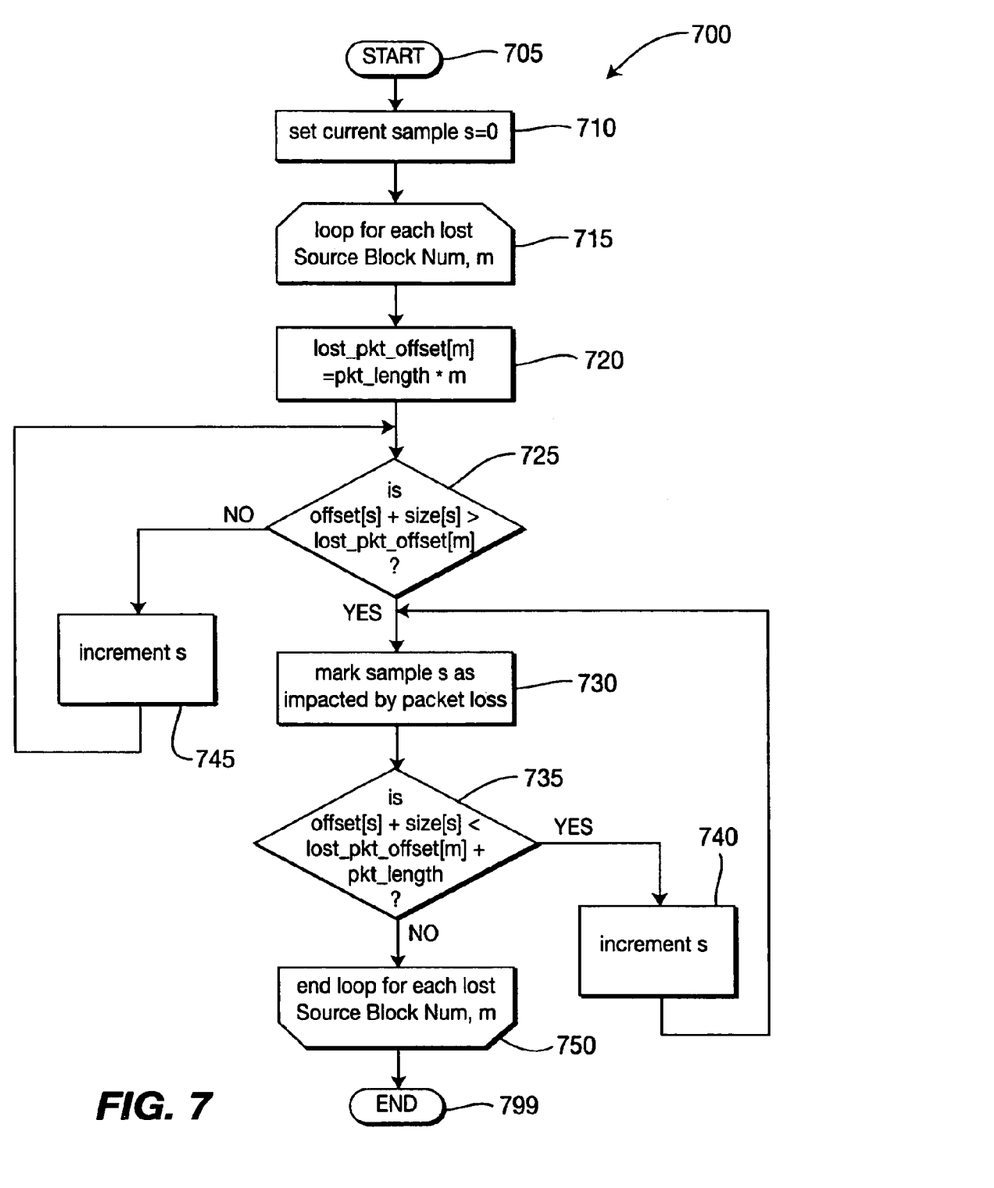
FIG. 7 is a flow diagram for an exemplary method for determining samples impacted by lost packets, in accordance with an embodiment of the present principles.

Turning to FIG. 7, an exemplary method for determining samples impacted by lost packets is indicated generally by the reference numeral 700.

The method 700 includes a start block 705 that passes control to a function block 710. The function block 710 sets the current sample, denoted by the variable s, equal to 0, and passes control to a loop limit block 715. The loop limit block 715 performs a loop for each lost source block, denoted by the variable, m, which denotes the source block number, and passes control to a function block 720. The function block 720 sets lost_pkt_offset[m] equal to pkt_length*m, and passes control to a decision block 725. The decision block 725 determines whether or not the offset[s]+size[s] is greater than lost_pkt_offset[m]. If so, then control is passed to a function block 730. Otherwise, control is passed to a function block 745.

The function block 730 marks the sample s as impacted by packet loss, and passes control to a decision block 735. The decision block 735 determines whether or not offset[s]+size[s]<lost_pkt_offset[m]+pkt_length. If so, then control is passed to a function block 740. Otherwise, control is passed to a loop limit block 750.

The function block 740 increments the variable s, and returns control to the function block 730.

The loop limit block 750 ends the loop over each lost source block, as denoted by variable m, and passes control to an end block 799.

The function block 745 increments s, and returns control to the decision block 725.

If the method 700 were applied to the example illustrated herein, the samples corresponding to pictures 1, 2, and 3 would be marked as being impacted by the packet loss.

After the impacted samples are determined, the container file is updated to patch those impacted samples using one of two exemplary options described herein. Of course, it is to be appreciated that the preceding exemplary options are for illustrative purposes and the present principles are not limited solely to these options, as one of ordinary skill in this and related arts would contemplate these and other options for updating the container file given the teachings of the present principles provided herein, while maintaining the spirit of the present principles.

Figure 5:
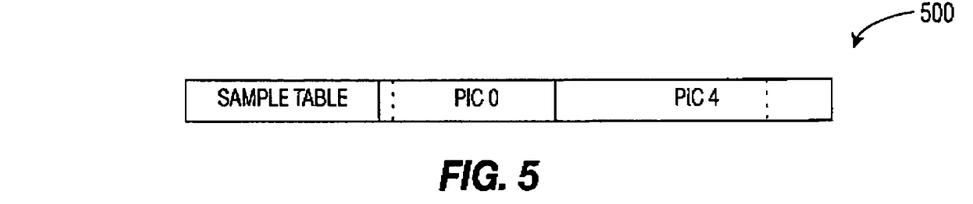
FIG. 5 is a diagram for an exemplary container file with transmit packetization and packet loss after file patching with a sample table updated according to a first exemplary updating option, in accordance with an embodiment of the present principles.

According to the first exemplary option, all data corresponding to the impacted samples is removed from the file, and the sample table is updated to remove all samples impacted by packet loss. Then the offsets of all other samples in the sample table are adjusted to account for the removed samples. For each sample removed, the size of the removed sample is subtracted from the offset value of all subsequent samples in the sample table. Following this option, the total size of the container file after patching is reduced. Turning to FIG. 5, an exemplary container file with transmit packetization and packet loss after file patching with a sample table updated according to the first exemplary updating option is indicated generally by the reference numeral 500.

Figure 6:
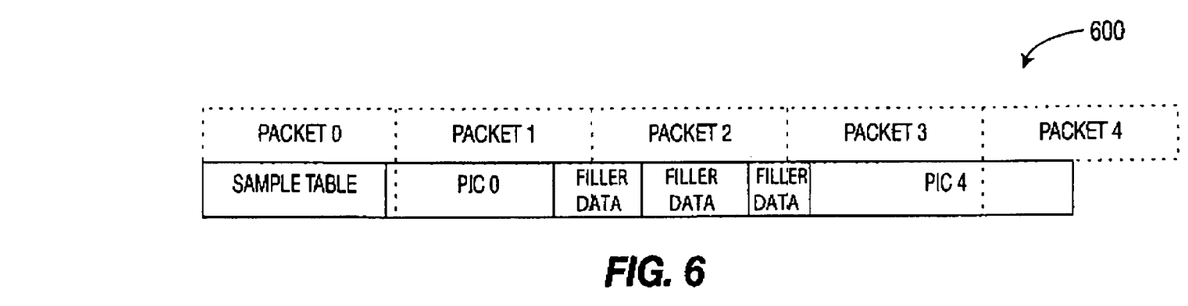
FIG. 6 is a diagram for an exemplary container file with transmit packetization and packet loss after file patching using filler data according to a second exemplary updating option, in accordance with an embodiment of the present principles.

According to the second exemplary option, the sample table is not modified. Instead, filler data is placed into the locations of all impacted samples. Following this option, the total size of the container file after patching is identical to the size of the original file. Turning to FIG. 6, an exemplary container file with transmit packetization and packet loss after file patching using filler data according to the second exemplary updating option is indicated generally by the reference numeral 600.

If the video compression standard used is the MPEG-4 AVC Standard, a Network Abstraction Layer unit including the filler data could be placed into the container file to replace an impacted sample. Another option for would be to set the forbidden_zero_bit in the Network Abstraction Layer unit header to 1, which indicates to the decoder that this is a corrupt Network Abstraction Layer unit. Note that some container file formats (such as, for example, the MPEG-4 AVC Standard file format as applied to MPEG-4 AVC Standard encoded video) may store a sequence of Network Abstraction Layer (NAL) units within a single sample by prepending each Network Abstraction Layer unit with the size of the unit (NALUnitLength). If the forbidden_zero_bit method is used for indicating corruption, the NALUnitLength must be adjusted to reflect the full size of the impacted sample (minus the size of the NALUnitLength field) if multiple Network Abstraction Layer units are present within an impacted sample.

The basic unit of the sample in the container file is typically an entire coded picture. However, this concept can also apply to individual slices. Coded pictures or coded slices are removed when at least a portion of their data was lost during transmission.

Figure 8:
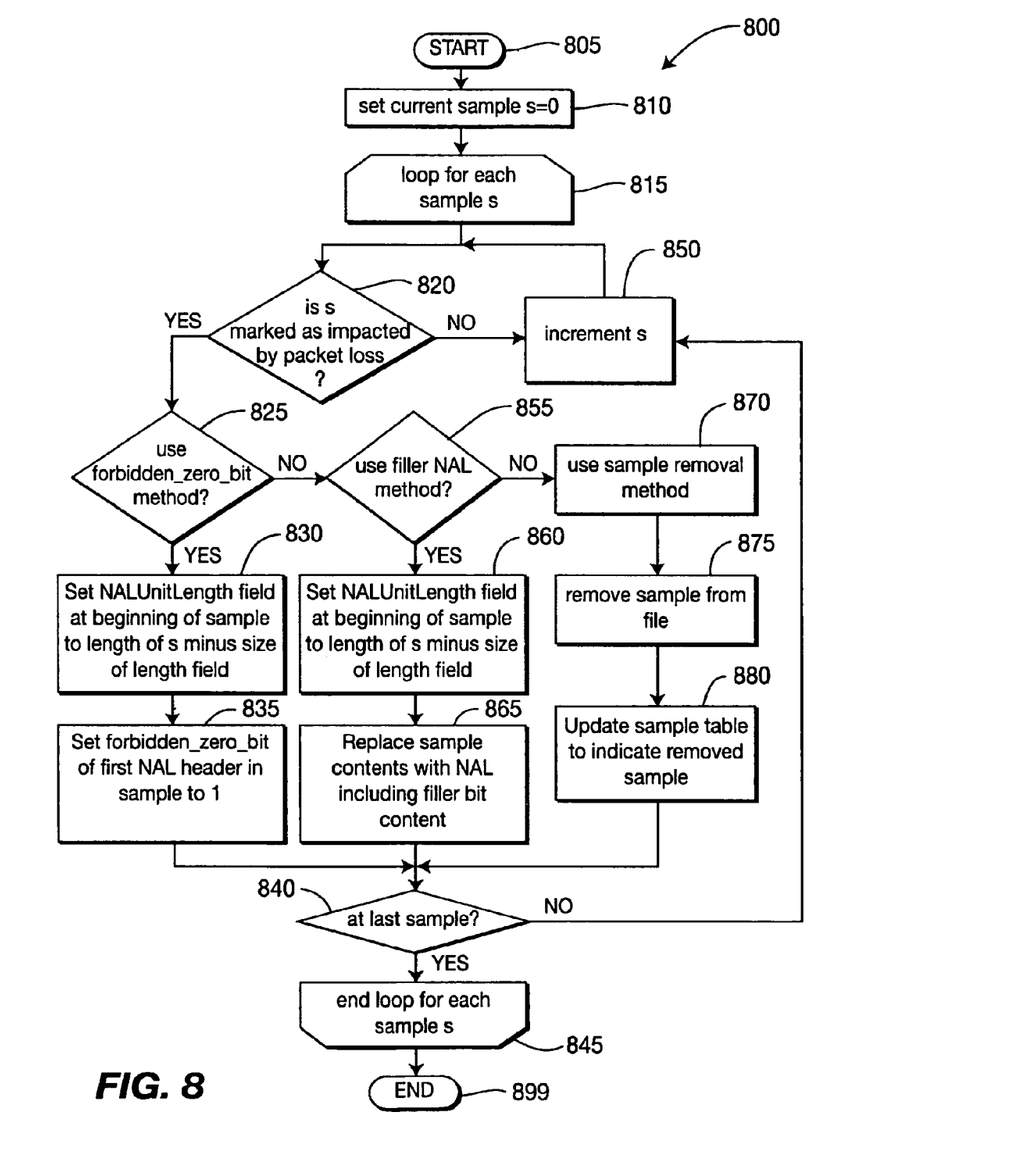
FIG. 8 is a flow diagram for an exemplary method for replacing samples impacted by lost packets, in accordance with an embodiment of the present principles.

Turning to FIG. 8, an exemplary method for replacing samples impacted by lost packets is indicated generally by the reference numeral 800.

The method 800 includes a start block 805 that passes control to a function block 810. The function block 810 sets the current sample s equal to zero, and passes control to a loop limit block 815. The function block 815 performs a loop over each sample s, and passes control to a decision block 820.

The decision block 820 determines whether or not s is marked as impacted by packet loss. If so, then control is passed to a decision block 825. Otherwise, control is passed to a function block 850.

The decision block 825 determines whether or not to use the forbidden_zero_bit method. If so, then control is passed to a function block 830. Otherwise, control is passed to a decision block 855.

The function block 830 sets the NALUnitLength field at the beginning of a current sample to the length of the sample s minus the size of the length field, and passes control to a function block 835. The function block 835 sets forbidden_zero_bit of the first NAL header in the current sample s equal to one, and passes control to a decision block 840.

The decision block 840 determines whether or not the current sample s is the last sample. If so, then control is passed to a loop limit block 845. Otherwise, control is passed to the function block 850.

The function block 845 ends the loop over each sample s, and passes control to an end block 899.

The function block 850 increments s, and returns control to the decision block 820.

The decision block 855 determines whether or not to use the filler NAL method. If so, then control is passed to a function block 860. Otherwise, control is passed to a function block 870.

The function block 860 sets the NALUnitLength field at the beginning of a current sample to the length of the sample s minus the size of the length field, and passes control to a function block 865. The function block 865 replaces the sample contents with a NAL that includes filler bit content, and passes control to the decision block 840.

The function block 870 designates that the sample removal method is to be used, and passes control to a function block 875. The function block 875 removes the sample from the file, and passes control to a function block 880. The function block 880 updates the sample table to indicate the removed sample, and passes control to the decision block 840.

A description will now be given of some of the many attendant advantages/features of the present invention, some of which have been mentioned above. For example, one advantage/feature is an apparatus that includes a receiver and a file patcher. The receiver is for receiving packets including container files therein, identifying any of the packets for which a packet loss has occurred, and identifying at least one sample having data included in the identified packets that is affected by the packet loss. The at least one sample respectively corresponds to a particular container file. The file patcher is for repairing the particular container file with respect to the at least one sample.

Another advantage/feature is the apparatus having the receiver and the file patcher as described above, wherein the file patcher repairs the particular container file by removing the at least one sample from the particular container file, and updating a sample table of the particular container file to indicate the removal of the at least one sample.

Yet another advantage/feature is the apparatus having the receiver and the file patcher wherein the file patcher repairs the particular container file by removing the at least one sample from the particular container file, and updating a sample table of the particular container file to indicate the removal of the at least one sample as described above, wherein the file patcher updates offsets of subsequent samples in the sample table to account for the removal of the at least one sample.

Moreover, another advantage/feature is the apparatus having the receiver and the file patcher wherein the file patcher updates offsets of subsequent samples in the sample table to account for the removal of the at least one sample as described above, wherein the file patcher subtracts a size of the at least one sample from the offsets of the subsequent samples Further, another advantage/feature is the apparatus having the receiver and the file patcher as described above, wherein the file patcher repairs the particular container file by replacing the at least one sample with filler bit content.

Also, another advantage/feature is the apparatus having the receiver and the file patcher as described above, wherein the receiver identifies any of the packets for which the packet loss has occurred based on at least one of a packet length, a source block number, a container file sample table sample offset value, and a container file sample table sample size.

Additionally, another advantage/feature is the apparatus having the receiver and the file patcher as described above, wherein the receiver identifies any of the packets for which the packet loss has occurred by respectively determining whether any overlap exists between bytes included in each of the packets and corresponding samples in a respective one of the container files using at least one of packet parameters and container file format sample table parameters, and identifies any of the packets as having suffered a packet loss when the overlap exists.

Moreover, another advantage/feature is the apparatus having the receiver and the file patcher as described above, wherein the at least one sample includes any of a partially received sample and a fully missing sample, and the file patcher sets a bit in a Network Abstraction Layer unit header corresponding to the at least one sample to indicate that the at least one sample is corrupt.

Further, another advantage/feature is the apparatus having the receiver and the file patcher as described above, wherein the file patcher sets a forbidden_zero_bit to one in at least one Network Abstraction Layer unit corresponding to the at least one sample to indicate that the at least one sample is corrupt.

Also, another advantage/feature is the apparatus having the receiver and the file patcher as described above, wherein the file patcher repairs the particular container file prior to decoding thereof.

Additionally, another advantage/feature is the apparatus having the receiver and the file patcher as described above, wherein the at least one sample includes any of a partially received sample and a fully missing sample.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
 a receiver for receiving packets including container files therein, identifying any of the packets for which a packet loss has occurred, identifying at least one sample having data included in the identified packets that is affected by the packet loss, the at least one sample respectively corresponding to a particular container file, wherein the at least one sample corresponds to one of one or more compressed pictures and a time-contiguous compressed section of audio and includes more than one packet, and
 a file patcher for repairing the particular container file with respect to the at least one sample by replacing the at least one sample with filler data if the at least one sample is partially received.

2. The apparatus of claim 1, wherein said receiver identifies any of the packets for which the packet loss has occurred based on at least one of a packet length, a source block number, a container file sample table sample offset value, and a container file sample table sample size.

3. The apparatus of claim 1, wherein said receiver identifies any of the packets for which the packet loss has occurred by respectively determining whether any overlap exists between bytes included in each of the packets and corresponding samples in a respective one of the container files using at least one of packet parameters and container file format sample table parameters, and identifies any of the packets as having suffered a packet loss when the overlap exists.

4. The apparatus of claim 1, wherein the at least one sample includes any of a partially received sample and a fully missing sample, and said file patcher sets a bit in a Network Abstraction Layer unit header corresponding to the at least one sample to indicate that the at least one sample is corrupt.

5. The apparatus of claim 1, wherein said file patcher sets a forbidden_zero_bit to one in at least one Network Abstraction Layer unit corresponding to the at least one sample to indicate that the at least one sample is corrupt.

6. The apparatus of claim 1, wherein said file patcher repairs the particular container file prior to decoding thereof.

7. A method, comprising:
 receiving packets including container files therein;
 identifying any of the packets for which a packet loss has occurred;
 identifying at least one sample having data included in the identified packets that is affected by the packet loss, the at least one sample respectively corresponding to a particular container file, wherein the at least one sample corresponds to one of one or more compressed pictures and a time-contiguous compressed section of audio and includes more than one packet; and
 repairing the particular container file with respect to the at least one sample by replacing the at least one sample with filler data if the at least one sample is partially received.

8. The method of claim 7, wherein said step of identifying any of the packets for which a packet loss has occurred uses at least one of a packet length, a source block number, a container file sample table sample offset value, and a container file sample table sample size.

9. The method of claim 7, wherein said step of identifying any of the packets for which a packet loss has occurred comprises respectively determining whether any overlap exists between bytes included in each of the packets and corresponding samples in a respective one of the container files using at least one of packet parameters and container file format sample table parameters, and identifies any of the packets as having suffered a packet loss when the overlap exists.

10. The method of claim 7, wherein said repairing step comprises setting a bit in a Network Abstraction Layer unit header corresponding to the at least one sample to indicate that the at least one sample is corrupt.

11. The method of claim 7, wherein said repairing step comprises setting a forbidden_zero_bit to one in at least one Network Abstraction Layer unit corresponding to the at least one sample to indicate that the at least one sample is corrupt.

12. The method of claim 7, wherein said repairing step is performed prior to a decoding of the particular container file.

\* \* \* \* \*